United States Patent
Horiuchi et al.

(10) Patent No.: US 10,923,254 B2
(45) Date of Patent: *Feb. 16, 2021

(54) PERMANENT MAGNET, MOTOR, AND GENERATOR

(71) Applicant: KABUSHIKI KAISHA TOSHIBA, Tokyo (JP)

(72) Inventors: Yosuke Horiuchi, Tokyo (JP); Shinya Sakurada, Tokyo (JP); Masaya Hagiwara, Kanagawa (JP); Tsuyoshi Kobayashi, Kanagawa (JP); Tadahiko Kobayashi, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 15/413,593

(22) Filed: Jan. 24, 2017

(65) Prior Publication Data
US 2017/0162304 A1    Jun. 8, 2017

Related U.S. Application Data

(63) Continuation of application No. PCT/JP2015/001638, filed on Mar. 23, 2015.

(51) Int. Cl.
*H01F 1/055* (2006.01)
*H02K 1/02* (2006.01)
(Continued)

(52) U.S. Cl.
CPC ............ *H01F 1/055* (2013.01); *B22F 3/1017* (2013.01); *C22C 19/07* (2013.01); *C22C 28/00* (2013.01);
(Continued)

(58) Field of Classification Search
None
See application file for complete search history.

(56) References Cited

U.S. PATENT DOCUMENTS 10,650,947 B2 *   5/2020   Horiuchi .................. C22F 1/10
2013/0076184 A1   3/2013   Horiuchi et al.
(Continued)

FOREIGN PATENT DOCUMENTS

CN    103021621    4/2013
CN    103839639    6/2014
(Continued)

OTHER PUBLICATIONS

Liu et al. (IEEE Transactions on Magnetics, 1989, vol. 25, No. 5, p. 3785-3787) (Year: 1989).*

(Continued)

*Primary Examiner* — Xiaowei Su
(74) *Attorney, Agent, or Firm* — Amin, Turocy & Watson, LLP

(57) ABSTRACT

A permanent magnet expressed by a composition formula: $R_p Fe_q M_r Cu_t Co_{100-p-q-r-t}$. The magnet comprises a metallic structure including crystal grains which constitutes a main phase having a $Th_2 Zn_{17}$ crystal phase. An average value of Fe concentrations in the crystal grains of 20 or more is 28 atomic percent or more and an average value of R element concentrations in the crystal grains of 20 or more is 10 atomic percent or more.

9 Claims, 2 Drawing Sheets

(51) Int. Cl.
*H02K 1/27* (2006.01)
*H02K 21/14* (2006.01)
*B22F 3/10* (2006.01)
*C22C 19/07* (2006.01)
*C22C 28/00* (2006.01)
*C22C 30/00* (2006.01)
*H02K 1/17* (2006.01)
*H02K 21/00* (2006.01)

(52) U.S. Cl.
CPC ........... *C22C 30/00* (2013.01); *H01F 1/0551* (2013.01); *H01F 1/0557* (2013.01); *H02K 1/17* (2013.01); *H02K 1/27* (2013.01); *H02K 1/276* (2013.01); *H02K 1/2766* (2013.01); *H02K 21/00* (2013.01); *H02K 21/14* (2013.01); *B22F 2998/10* (2013.01)

(56) References Cited

U.S. PATENT DOCUMENTS

| | | | |
|---|---|---|---|
| 2013/0082559 A1* | 4/2013 | Hagiwara | H02K 1/2766 310/152 |
| 2014/0139064 A1 | 5/2014 | Horiuchi et al. | |
| 2014/0139305 A1 | 5/2014 | Horiuchi et al. | |
| 2015/0143952 A1 | 5/2015 | Horiuchi et al. | |
| 2015/0147228 A1 | 5/2015 | Endo et al. | |
| 2015/0221422 A1 | 8/2015 | Sakurada et al. | |
| 2015/0270039 A1* | 9/2015 | Horiuchi | C22C 19/07 310/152 |
| 2015/0270040 A1* | 9/2015 | Horiuchi | C22C 19/07 310/152 |
| 2017/0271060 A1* | 9/2017 | Takahashi | H01F 1/0536 |
| 2018/0144850 A1* | 5/2018 | Okamoto | H01F 1/086 |

FOREIGN PATENT DOCUMENTS

| | | |
|---|---|---|
| CN | 103839652 | 6/2014 |
| EP | 2 733 711 | 11/2013 |
| EP | 2 733 710 | 5/2014 |
| EP | 3046120 | 7/2016 |
| EP | 3121820 | 1/2017 |
| EP | 3121821 | 1/2017 |
| EP | 3226262 | 10/2017 |
| JP | 6-212327 | 8/1994 |
| JP | 9-111383 | 4/1997 |
| JP | 2013-072097 | 4/2013 |
| JP | 2014-103239 | 6/2014 |
| JP | 2014-103281 | 6/2014 |
| WO | 2014/156031 A1 | 10/2014 |
| WO | 2014/156047 A1 | 10/2014 |
| WO | 2015/037037 | 3/2015 |

OTHER PUBLICATIONS

Hadjipanayis (IEEE Transactions on Magnetics, 2000, vol. 36, p. 3382-3387) (Year: 2000).*
Extended European Search Report for European Patent Application No. 15886179.9 dated Oct. 22, 2018.
International Search Report for International Patent Application No. PCT/JP2015/001638 dated Jun. 2, 2015, 5 pages.
Written Opinion for International Patent Application No. PCT/JP2015/001638 dated Jun. 2, 2015, 3 pages.

* cited by examiner

PERMANENT MAGNET, MOTOR, AND GENERATOR

CROSS-REFERENCE TO RELATED APPLICATIONS

This application is a continuation of prior International Application No. PCT/JP2015/001638 filed on Mar. 23, 2015; the entire contents of all of which are incorporated herein by reference.

FIELD

Embodiments described herein generally relate to a permanent magnet, a motor, and a generator.

BACKGROUND

Known examples of a high-performance rare earth magnet include a Sm—Co-based magnet, a Nd—Fe—B-based magnet, and the like. Fe and Co in the magnets contribute to an increase in saturation magnetization. These magnets contain rare earth elements such as Nd and Sm, which bring about large magnetic anisotropy derived from the behavior of 4f electron in the rare earth elements in a crystal field. This creates high coercive force, thereby realizing the high-performance magnet.

The high-performance magnet is mainly used for electrical devices such as a motor, a speaker, and a measuring instrument. In recent years, requests for downsizing, weight reduction, and low power consumption of various electrical devices have been increased. In response to the requests, there is a demand for a permanent magnet with higher performance that has an improved maximum magnetic energy product (BHmax) of the permanent magnet. In recent years, a variable magnetic flux motor has been proposed, and contributes to an improvement in efficiency of a motor.

The Sm—Co-based magnet is high in Curie temperature and can achieve good motor property at high temperature. However, the Sm—Co-based magnet is desired to have a higher coercive force, higher magnetization, and an improved squareness ratio. It is considered that increasing the concentration of Fe is effective for higher magnetization of the Sm—Co-based magnet. However, with the conventional manufacturing method, increasing the concentration of Fe tends to deteriorate the squareness ratio. Thus, the realization of a high-performance magnet for motor requires a technique that achieves expression of a good squareness ratio while improving the magnetization with a high Fe concentration composition.

DETAILED DESCRIPTION

Figure 1:
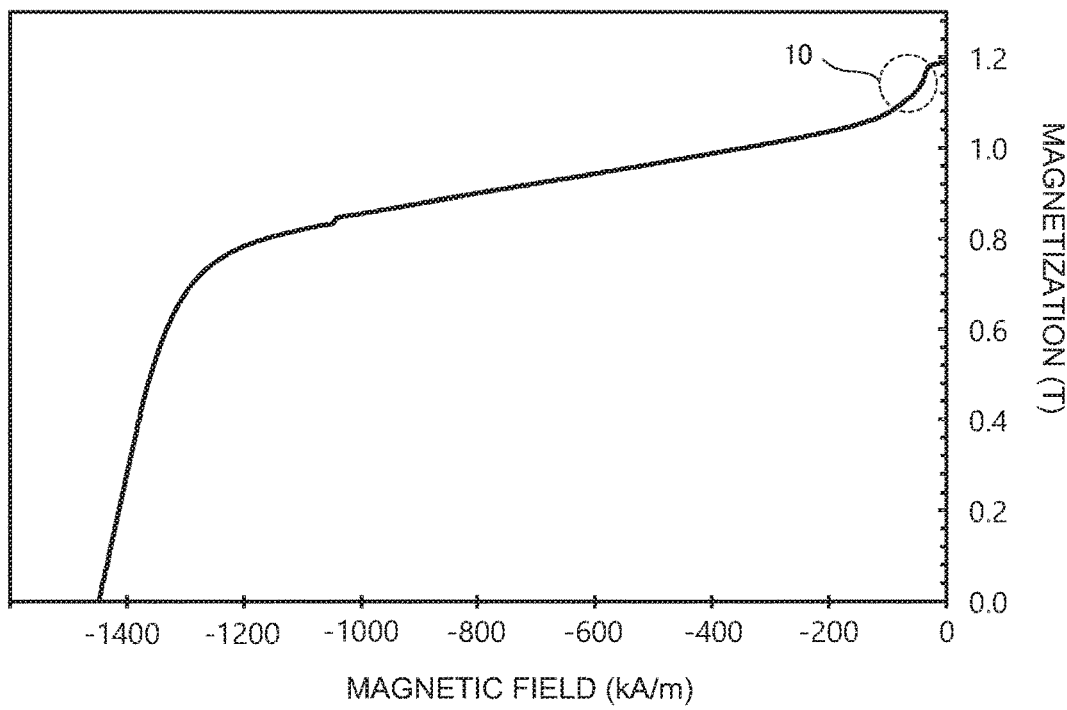
FIG. 1 is a view illustrating an example of a deterioration of magnetization.

A permanent magnet expressed by a composition formula: $R_pFe_qM_rCu_tCo_{100-p-q-r-t}$. R represents at least one element selected from the group consisting of rare earth elements, M represents at least one element selected from a group consisting of Zr, Ti, and Hf, p is a number satisfying $10.5 \leq p \leq 12.4$ atomic percent, q is a number satisfying $28 \leq q \leq 40$ atomic percent, r is a number satisfying $0.88 \leq r \leq 4.3$ atomic percent, and t is a number satisfying $3.5 \leq t \leq 13.5$ atomic percent. The magnet comprises a metallic structure including crystal grains which constitutes a main phase having a $Th_2Zn_{17}$ crystal phase. An average value of Fe concentrations in the crystal grains of 20 or more is 28 atomic percent or more and an average value of R element concentrations in the crystal grains of 20 or more is 10 atomic percent or more.

Hereinafter, embodiments will be described with reference to the accompanying drawings. The drawings are schematically illustrated, in which, for example, the relation between a thickness and plane dimensions, and a ratio between thicknesses of layers may differ from actual ones. In the embodiments, same reference numerals are given to substantially the same components to omit redundant description.

First Embodiment

A permanent magnet according to this embodiment will be described below.
<Configuration Example of Permanent Magnet>
The permanent magnet of this embodiment includes: a sintered body including a composition expressed by a composition formula: $R_pFe_qM_rCu_tCo_{100-p-q-r-t}$, (in the formula, R represents at least one element selected from rare earth elements, M represents at least one element selected from a group consisting of Zr, Ti, and Hf, p is a number satisfying $10.5 \leq p \leq 12.4$ atomic percent, q is a number satisfying $28 \leq q \leq 40$ atomic percent, r is a number satisfying $0.88 \leq r \leq 4.3$ atomic percent, and t is a number satisfying $3.5 \leq t \leq 13.5$ atomic percent).

The R in the composition formula is an element that can provide large magnetic anisotropy to a magnetic material. As the R element, one element or a plurality of elements selected from rare earth elements including, for example, yttrium (Y) can be used, and, for example, samarium (Sm), cerium (Ce), neodymium (Nd), praseodymium (Pr), or the like can be used. Especially, the use of Sm is preferable. For example, in the case where a plurality of elements including Sm are used as the R element, the Sm concentration is set to 50 atomic percent or more with respect to all the elements usable as the R element, thereby enabling enhancement of performance of the magnet material, for example, a coercive force. Sm is included preferably by 70 atomic percent or more with respect to the elements usable as the R element, and more preferably by 90 atomic percent or more.

Setting the concentration of the element usable as the R element, for example, to not less than 10.5 atomic percent nor more than 12.4 atomic percent can increase the coercive force. When the concentration of the element usable as the R element is less than 10.5 atomic percent, a large amount of α-Fe precipitates, resulting in decreased coercive force. When the concentration of the element usable as the R element is more than 12.4 atomic percent, the saturation magnetization deteriorates. The concentration of the element usable as the R element is preferably not less than 10.9 atomic percent nor more than 12.1 atomic percent, and more preferably not less than 11.0 atomic percent nor more than 12.0 atomic percent.

The M in the composition formula is an element that can express high coercive force in the composition with high Fe concentration. As the M element, for example, one element or a plurality of elements selected from a group consisting of titanium (Ti), zirconium (Zr), and hafnium (Hf) are used.

When the content r of the M element is more than 4.3 atomic percent, a hetero-phase excessively containing the M element is more likely to be generated, and both the coercive force and the magnetization are more likely to deteriorate. When the content r of the M element is less than 0.88 atomic percent, an effect of increasing the Fe concentration tends to decrease. In short, the content r of the M element is preferably not less than 0.88 atomic percent nor more than 4.3 atomic percent. The content r of the M element is more preferably not less than 1.14 atomic percent nor more than 3.58 atomic percent, furthermore preferably not less than 1.49 atomic percent nor more than 2.24 atomic percent, and moreover preferably not less than 1.55 atomic percent nor more than 2.23 atomic percent.

The M element preferably contains at least Zr. In particular, using Zr by 50 atomic percent or more of the M element enhances the coercive force of the permanent magnet. On the other hand, Hf is especially expensive in the M element, and therefore the usage of Hf, if used, is preferably small. For example, the content of Hf is preferably less than 20 atomic percent of the M element.

Cu is an element that can express high coercive force in the magnet material. The content of Cu is preferably, for example, not less than 3.5 atomic percent nor more than 13.5 atomic percent. When Cu is compounded by an amount larger than the range, the magnetization significantly deteriorates. When Cu is compounded by an amount smaller than the range, it becomes difficult to obtain high coercive force and a good squareness ratio. A content t of Cu is more preferably not less than 3.9 atomic percent nor more than 9.0 atomic percent, and furthermore preferably not less than 4.3 atomic percent nor more than 5.8 atomic percent.

Fe is an element that mainly performs magnetization of the magnet material. When a large amount of Fe is compounded, it is possible to enhance the saturation magnetization of the magnet material. However, when Fe is excessively compounded, it becomes difficulty to obtain a desired crystal phase because of precipitation of α-Fe and phase separation, possibly decreasing the coercive force. A content q of Fe is therefore preferably not less than 28 atomic percent nor more than 40 atomic percent. The content q of Fe is more preferably not less than 29 atomic percent nor more than 36 atomic percent, and furthermore preferably not less than 30 atomic percent nor more than 33 atomic percent.

Co is an element that performs magnetization of the magnet material and can express high coercive force. When a large amount Co is compounded, a high Curie temperature can be obtained to enhance thermal stability of the magnetic property. When the amount of Co compounded is small, these effects decrease. However, when Co is excessively added, the proportion of Fe relatively reduces, possibly resulting in deterioration of magnetization. Replacing 20 atomic percent or less of Co with one element or a plurality of elements selected from a group consisting of Ni, V, Cr, Mn, Al, Si, Ga, Nb, Ta, and W enhances the magnetic property, for example, the coercive force.

The permanent magnet of this embodiment has a two-dimensional metallic structure including a main phase having a hexagonal $Th_2Zn_{17}$ crystal phase (2-17 crystal phase) and a grain boundary phase arranged between crystal grains constituting the main phase. The main phase further has a cell phase having a 2-17 crystal phase, and a Cu rich phase having a hexagonal $CaCu_5$ crystal phase (1-5 crystal phase). Preferably, the Cu rich phase is formed to surround the cell phase. The above structure is also referred to as a cell structure. The Cu rich phase also includes a cell wall phase that separates the cell phase. Preferably, the c-axis of the $Th_2Zn_{17}$ crystal phase extends in parallel to the easy magnetization axis. It should be noted that "parallel" may include a state of falling within ±10 degrees from the parallel direction (approximately parallel).

The Cu rich phase is a phase high in Cu concentration. The Cu concentration in the Cu rich phase is higher than the Cu concentration in the $Th_2Zn_{17}$ crystal phase. For example, the Cu concentration in the Cu rich phase is preferably equal to or more than 1.2 times the Cu concentration in the $Th_2Zn_{17}$ crystal phase. The Cu rich phase is present, for example, in a linear shape or a plate shape at a cross section including the c-axis of the $Th_2Zn_{17}$ crystal phase. Examples of the structure of the Cu rich phase are not specifically limited but include the hexagonal $CaCu_5$ crystal phase (1-5 crystal phase) and the like. The permanent magnet may have a plurality of Cu rich phases different in phase.

The magnetic domain wall energy of the Cu rich phase is higher than the magnetic domain wall energy of the $Th_2Zn_{17}$ crystal phase. This difference in the magnetic domain wall energy constitutes a barrier to movement of the magnetic domain wall. Specifically, the Cu rich phase serves as a pinning site, making it possible to restrict the movement of the magnetic domain wall between a plurality of cell phases. In particular, forming the cell structure enhances the effect of restricting the movement of the magnetic domain wall. This is also referred to as a magnetic domain wall pinning effect. Thus, more preferably, the Cu rich phase is formed to surround the cell phase.

In a Sm—Co-based magnet containing 28 atomic percent or more of Fe, the Cu concentration in the Cu rich phase is preferably not less than 10 atomic percent nor more than 60 atomic percent. Increasing the Cu concentration in the Cu rich phase can increase the coercive force and the squareness ratio. In the area where the Fe concentration is high, the Cu concentration in the Cu rich phase is likely to vary, causing, for example, a Cu rich phase having a high magnetic domain wall pinning effect and a Cu rich phase having a low magnetic domain wall pinning effect. This deteriorates the coercive force and the squareness ratio.

If the magnetic domain wall shifting from the pinning site moves, the magnetization is inverted correspondingly to the movement, resulting in deteriorated magnetization. If all the magnetic domain walls shift from the pinning site in a certain magnetic field upon application of an external magnetic field, the magnetization becomes less likely to deteriorate due to application of a magnetic field, resulting in a good squareness ratio. In other words, it is considered that if the magnetic domain wall shifts from the pinning site and moves in a magnetic field that is weaker than the coercive force upon application of a magnetic field, the magnetization decreases correspondingly to the movement, leading to deterioration of the squareness ratio.

FIG. 1 illustrates an example of an M-H curve when the magnetization deteriorates. The horizontal axis represents a magnetic field H and the vertical axis represents magnetization M. In the conventional permanent magnet, the magnetization rapidly deteriorates in a second quadrant of the M-H curve as illustrated in FIG. 1, to generate a recessed region 10. To determine the proportion of the deterioration of magnetization, it is only necessary to calculate, for example, the proportion of the magnetization when a magnetic field causing the recessed region 10 to start to occur is applied, to the residual magnetization. For example, the magnetization when the magnetic field H is −200 kA/m is less than 90% of the residual magnetization in FIG. 1.

In the permanent magnet of this embodiment, the occurrence of the recessed region 10 is suppressed, namely, the deterioration of magnetization is suppressed by controlling the Fe concentration and the R element concentration in the main phase.

In the permanent magnet of this embodiment, in the main phase, the Fe concentration is 28 atomic percent or more and the R element concentration is 10 atomic percent or more. The main phase preferably has, for example, a composition expressed by a composition formula: $R_{p1}Fe_{q1}M_{r1}Cu_{t1}Co_{100-p1-q1-r1-t1}$, where p1 is a number satisfying $11.1 \leq p1 \leq 20$ atomic percent, q1 is a number satisfying $28 \leq q1 \leq 40$ atomic percent, r1 is a number satisfying $1 \leq r1 \leq 15$ atomic percent, and t1 is a number satisfying $4 \leq t1 \leq 13.5$ atomic percent. In short, the R element concentration in the main phase is preferably higher than the R element concentration in the whole composition.

The permanent magnet has a hetero-phase such as an oxide of the R element and a carbide of the M element in addition to the main phase. The abundance ratio of the hetero-phase may differ the value of the composition of the main phase in composition analysis from that of the composition of the actual main phase. It is therefore important to control the production amount of the hetero-phase in order to control the composition of the actual main phase.

When the Fe concentration in the main phase is less than 28 atomic percent, the characteristics stably develop even when the R element concentration in the main phase is not less than 9 atomic percent nor more than 12.5 atomic percent. On the other hand, when the Fe concentration in the main phase is 28 atomic percent or more, a recessed region may occur in the M-H curve due to the effect of the hetero-phase when the R element concentration is not less than 9 atomic percent nor more than 12.5 atomic percent, resulting in unstable characteristics. The different in characteristics is difficult to confirm, for example, by X-ray diffraction (XRD) measurement or the like.

In the composition with a Fe concentration of 28 atomic percent or more, variation in composition between crystal grains is likely to be large due to the hetero-phase. For example, even when the R element concentration of a certain crystal grain is 10 atomic percent, the R element concentration of a crystal grain around the crystal grain may be 8 atomic percent, 15 atomic percent or the like. Thus, it is necessary to take the average value at least at 30 or more measurement locations as the average composition of the main phase.

To stably develop the characteristics, it is necessary to control the average value of the iron concentration and the average value of the R element concentration to predetermined values or more in a plurality of crystal grains constituting the main phase. For example, in the main phase of the composition with a Fe concentration of 28 atomic percent or more, even if the R element concentration of a part of crystal grains is 12 atomic percent, the average value of the R element concentration in the plurality of crystal grains may be less than 10 atomic percent. When the average value of the R element concentration is less than 10 atomic percent, the number of crystal grains not forming the cell structure increases, making a recessed region likely to occur in the M-H curve.

Hence, in the permanent magnet of this embodiment, the deterioration of magnetization is suppressed by controlling the average value of the Fe concentration to 28 atomic percent or more and the average value of the R element concentration to 10 atomic percent or more in a plurality of crystal grains constituting the main phase. The number of the plurality of crystal grains is set to, for example, not less than 20 nor more than 80. In the permanent magnet of this embodiment, the magnetization when the magnetic field H is −200 kA/m can be made 90% or more of the residual magnetization in the M-H curve.

The composition of the permanent magnet is analyzed by, for example, an ICP (Inductively Coupled Plasma) emission spectrochemical analysis method, an SEM-EDX (SEM-Energy Dispersive X-ray Spectroscopy), a TEM-EDX (Transmission Electron Microscope-EDX) or the like. The volume ratios of the phases are comprehensively determined using the observations under an electron microscope and an optical microscope and the X-ray diffraction or the like in combination. The volume ratios can be obtained by an areal analysis method using an electron micrograph of a cross section of the permanent magnet. As the cross section of the permanent magnet, a cross section of a substantially center part of a surface having the largest surface area of the specimen is used.

The metallic structure such as the $Th_2Zn_{17}$ crystal phase and the Cu rich phase is identified, for example, in the following manner. First, a sample is observed by a scanning transmission electron microscope (STEM). In this event, the sample is observed under the SEM to find the place of the grain boundary phase, and the sample is processed using a focused ion beam (FIB) such that the grain boundary phase is present in the field of vision, making it possible to enhance the observation efficiency. The sample is the one undergone the aging treatment. In this event, the sample is preferably a non-magnetized article.

Subsequently, the concentrations of the elements in the cell phase, the Cu rich phase and the like are measured by using, for example, an energy dispersive X-ray spectroscopy (STEM-EDX) utilizing STEM.

When the concentrations of the elements are measured by the STEM-EDX, a specimen is cut out from the interior of the sample at a depth of 1 mm or more from the surface of the sample. The observation is carried out at an observation magnification of 100 k power to a plane parallel to the easy magnetization axis (c-axis).

For concentration measurement of the elements in each phase, a 3-dimension atom probe (3DAP) may be used. The analysis method using the 3DAP is an analysis method that applies a voltage to cause an electric field evaporation of an observed specimen, and detects ions generated by the electric field evaporation with a two-dimensional detector, to thereby identify an atomic arrangement. Ionic species are identified from the flight time taken to reach the two-dimensional detector. Individually detected ions are consecutively detected in a depth direction, and the detected ions are arranged (reconstructed) in the detected order. This provides a three-dimensional atomic distribution. Compared to the concentration measurement with the TEM-EDX, this analysis method can more precisely measure each element concentration in each crystal phase.

The measurement of the element concentration in each phase using the 3DAP is performed in accordance with the following procedure. First, the specimen is diced to thin pieces. From the thin pieces, needle-shaped specimens for pickup atom probe (AP) are prepared using the FIB.

The measurement using the 3DAP is performed on the inside of the sintered body. The measurement of the inside of the sintered body is as follows. First, at a center part of a longest side of a surface having the maximum area, the composition is measured at a surface portion and the inside of the cross section cut perpendicular to the side (in the case of a curved line, perpendicular to a tangent line of the center portion). The measurement location is defined such that, in the cross section, the one-half position of each side is set as a starting point, and a first reference line drawn perpendicular to the side and toward the inside up to the end portion and a second reference line drawn from the center of each corner portion as the starting point at the one-half position of an angle of an inner angle of the corner portion, toward the inside up to the end portion are set, and a position of 1% lengths of the reference lines from the starting points of the first reference line and second reference line is defined as a surface portion, and a position of 40% is defined as the inside. In the case where the corner portion has a curvature due to chamfering or the like, an intersection point of extended adjacent sides is set as the end portion of the side (the center of the corner portion). In this case, the measurement location is a position not from the intersection point but from a part in contact with the reference line.

By deciding the measurement locations as described above, for example, in the case of the cross section being a square, the reference lines are eight in total including four first reference lines and four second reference lines. The measurement locations are eight locations each at the surface portion and the inside. In this embodiment, the composition is preferably within the above-described range at all the eight locations each at the surface portion and the inside. However, the composition only needs to fall within the above-described range at least four locations or more each at the surface portion and the inside. This case does not specify the relationship between the surface portion and the inside on one reference line. The observation plane inside the sintered body specified in this manner is polished and smoothed, and then observed. For example, the observation locations by the TEM-EDX in the concentration measurement are arbitrary 20 points in each phase. An average value of the measured values at these points, excluding the maximum value and the minimum value, is calculated, and the average value is regarded as the concentration of each element. This also applies to the measurement using the 3DAP.

In the measurement result of the concentration in the Cu rich phase using the 3DAP, a sharper concentration profile of Cu in the Cu rich phase is preferable. Specifically, the full width at half maximum (FWHM) of the Cu concentration profile is preferably 5 nm or less. With this Cu concentration profile, a higher coercive force can be obtained. This is because when the Cu distribution in the Cu rich phase is sharp, the magnetic domain wall energy difference steeply appears between the cell phase and the Cu rich phase to cause the magnetic domain wall to be easily pinned.

The full width at half maximum (FWHM) of the concentration profile of Cu in the Cu rich phase is obtained in the following manner. Based on the above-described method, the highest value (PCu) of the Cu concentration is obtained from the Cu profile using the 3DAP. Then, the width of the peak being a half (PCu/2) of the highest value, namely, the full width at half maximum (FWHM) is found. Such measurement is performed for 10 peaks, and the average value of these values is defined as the full width at half maximum (FWHM) of the Cu profile. When the full width at half maximum (FWHM) of the Cu profile is 3 nm or less, the effect of improving the coercive force is more enhanced. When the full width at half maximum is 2 nm or less, a more beneficial effect of improving the coercive force can be obtained.

The squareness ratio is defined as follows. First, a DC B—H tracer measures DC magnetization characteristics at room temperature. Then, from the B—H curve obtained from the measurement result, residual magnetization $M_r$, a coercive force $_iHc$, and a maximum energy product (BH) max, which are basic properties of a magnet, are found. At this time, $M_r$ is used to find a theoretical maximum value (BH)max by the following expression (1).

$$(BH)\text{max (theoretical value)} = M_r^2/4\mu_0 \quad (1)$$

The squareness ratio is evaluated from a ratio between (BH)max obtained by the measurement and (BH)max (theoretical value), and is found by the following expression (2).

$$(BH)\text{max (actually measured value)}/(BH)\text{max (theoretical value)} \times 100 \quad (2)$$

The permanent magnet is also used, for example, as a bonded magnet. For example, using the above-described permanent magnet for a variable magnet in a variable magnetic flux drive system as disclosed in Japanese Laid-open Patent Publication No. 2008-29148 or Japanese Laid-open Patent Publication No. 2008-43172, enables efficiency improvement, downsizing, and cost reduction of the system. To use the above permanent magnet as the variable magnet, the aging treatment condition needs to be changed, for example, to make the coercive force fall within not less than 100 kA/m nor more than 350 kA/m.

<Method for Manufacturing the Permanent Magnet>

A an example of a method of manufacturing the permanent magnet will be described. First, an alloy powder is prepared which contains predetermined elements necessary to compose a permanent magnet. Then, the alloy powder is put in a metallic mold disposed in an electromagnet, and press-formed while a magnetic field is being applied thereon to manufacture a green compact having an oriented crystallographic axis.

For example, an alloy ingot obtained by casting a molten metal prepared by an arc melting method or a high frequency melting method can be pulverized to prepare an alloy powder. The alloy powder may be prepared to have a desired composition by mixing a plurality of powders different in composition. Further, the alloy powder may be prepared using a mechanical alloying method, a mechanical grinding method, a gas atomizing method, a reduction diffusion method or the like. In fabrication of an alloy thin strip using the strip cast method, a flake-shaped alloy thin strip is fabricated, and the alloy thin strip is then pulverized to prepare the alloy powder. For example, an alloy molten metal can be poured by tilting to a chill roll that rotates at a peripheral velocity of not less than 0.1 m/sec nor more than 20 m/sec to fabricate a thin strip in which the molten alloy is consecutively coagulated to a thickness of 1 mm or less. The peripheral velocity of less than 0.1 m/sec is likely to cause variation in composition in the thin strip. The peripheral velocity of more than 20 m/sec possibly deteriorates the magnetic property such as the crystal grains becoming too fine. The peripheral velocity of the chill roll is not less than 0.3 m/sec nor more than 15 m/sec, and more preferably not less than 0.5 m/sec nor more than 12 m/sec.

Furthermore, a heat treatment performed on the alloy powder or an alloy material before pulverization can homogenize the material. For example, a jet mill or a ball mill may be used to pulverize the material. Note that pulverizing the material in an inert gas atmosphere or an organic solvent can prevent oxidation of the powder.

When the average grain diameter of the powder after pulverization is not less than 2 μm nor more than 5 μm, and the proportion of the powder with the grain diameter of not less than 2 μm nor more than 10 μm is 80% or more of the whole powder, the degree of orientation becomes high and the coercive force becomes large. To realize the them, pulverization with the jet mill is preferable.

For example, in the case of pulverizing with the ball mill, even if the average grain diameter of the powder is not less than 2 μm nor more than 5 μm, a large amount of fine powder with a grain diameter at a submicron level is contained. Aggregation of the fine powder makes the c-axis of the crystal in the $TbCu_7$ phase becomes less likely to align in the direction of easy magnetization axis in magnetic field orientation during pressing, resulting in deterioration of the degree of orientation. The fine powder possibly increases the amount of oxide in the sintered body to deteriorate the coercive force. In particular, when the Fe concentration is 28 atomic percent or more, the proportion of the powder after pulverization having a grain diameter of 10 μm or more is desirably 10% or less of the whole powder. When the Fe concentration is 28 atomic percent or more, the amount of hetero-phase in the ingot being a raw material increases. In this hetero-phase, not only the amount of powder increases but also the grain diameter tends to increase such that the grain diameter may become 20 μm or more.

When such an ingot is pulverized, for example, the powder with a grain diameter of 15 μm or more may become the powder in the hetero-phase as it is. If the pulverized powder containing such coarse powder in the hetero-phase is pressed in a magnetic field to form a sintered body, the hetero-phase remains, causing deterioration of the coercive force, deterioration of the magnetization, deterioration of the squareness or the like. The deterioration of the squareness makes the magnetization difficult. In particular, magnetization after assembling to a rotor or the like becomes difficult. Thus, setting the powder with a grain diameter of 10 μm or more to 10% or less of the whole powder increases the coercive force while suppressing the deterioration of the squareness ratio in a high Fe concentration composition containing 28 atomic percent or more of Fe.

Then, sintering, a quality improvement treatment, and a solution heat treatment are performed. The quality improvement treatment is a treatment that controls the metallic structure, especially, the macro structure. The solution heat treatment is a treatment that forms the $TbCu_7$ crystal phase (1-7 crystal phase) which serves as a precursor of the phase separation structure.

In the sintering, a heat treatment is performed on the green compact by holding the green compact at a temperature of not lower than 1180° C. nor higher than 1220° C. for not less than 3 hours nor more than 15 hours. When the holding temperature is lower than 1180° C., the sintered body to be produced is likely to decrease in density. When the holding temperature is higher than 1220° C., the magnetic property possibly deteriorates due to excessive evaporation of the R element such as Sm in the powder. A more preferable holding temperature is not lower than 1190° C. nor higher than 1210° C. When the holding time is less than 3 hours, the density is likely to be non-uniform, and the magnetization is likely to deteriorate. Further, the crystal grain diameter of the sintered body decreases and the grain boundary phase ratio becomes high, thereby making the magnetization likely to deteriorate. When the heat treatment time is more than 15 hours, the evaporation of the R element in the powder becomes excessive, and the magnetic property possibly deteriorates. The holding time is more preferably not less than 2 hours nor more than 13 hours, and furthermore preferably not less than 3 hours nor more than 10 hours.

In the sintering, a molded body is set in a chamber, then the chamber is brought into a vacuum state, and the vacuum is maintained until the temperature becomes near the holding temperature. Then, the chamber is switched to an inert gas atmosphere such as Ar and held at the isothermal temperature, thereby improving the density of the sintered body. In the sintering step, the final pressure after switching to the inert atmosphere is preferably not less than 100 kPa nor more than 250 kPa. However, rapidly increasing the pressure directly after the switching is not preferable in terms of increasing the Fe concentration and the R element concentration in the main phase.

Hence, the sintering step is divided into at least two steps of a first sintering and a second sintering to increase the pressure stepwise. This can suppress occurrence of variation in the R element concentration in each crystal grain, thereby increasing the Fe concentration and the R element concentration in the main phase.

First, the first sintering is performed. In the first sintering, a heat treatment is performed for not less than 1 hour nor more than 8 hours in the above-described holding time at a pressure of not less than 10 kPa nor more than 100 kPa and at the above-described holding temperature. This makes the sintering more likely to uniformly proceed, and the R element concentration less likely to vary. When the time of the first sintering is less than 1 hour, the R element is likely to become non-uniform. Besides, when the pressure of the first sintering is less than 10 kPa or is more than 100 kPa, the R element concentration is likely to vary. The pressure of the first sintering is more preferably not less than 20 kPa nor more than 80 kPa.

Next, the second sintering is performed. In the second sintering, a heat treatment is performed for the remaining time in the above-described holding time at a pressure of not less than 100 kPa nor more than 250 kPa and at the above-described holding temperature. When the pressure of the second sintering is less than 100 kPa, sufficient sintered density cannot be obtained, possibly deteriorating the magnetization. Further, a large amount of R element remains. At this time, since the Cu rich phase is likely to precipitate, the R element in the main phase accordingly becomes too high, easily causing the hetero-phase instead. On the other hand, when the pressure of the second sintering is more than 250 kPa, the amount of evaporation of the R element increases, easily causing the hetero-phase. The pressure of the second sintering is preferably not less than 110 kPa nor more than 200 kPa, and more preferably not less than 120 kPa nor more than 150 kPa.

In the quality improvement treatment, a heat treatment is performed by holding the sintered body at a temperature lower by 10° C. or more than the heat treatment temperature in the sintering and a temperature higher by 10° C. or more than the heat treatment temperature in the solution heat treatment for not less than 2 hour nor more than 12 hours. In the case of performing the heat treatment not at the temperature lower by 10° C. or more than the heat treatment temperature in the sintering, the hetero-phase derived from the liquid phase generated during the sintering cannot be sufficiently removed. The orientation of the hetero-phase is often low, and existence of the hetero-phase makes the crystal orientation of the crystal grains more likely to deviate from the easy magnetization axis, resulting in not only decreased squareness ratio but also deteriorated magnetization. Further, in the solution heat treatment, the temperature is low, leading to difficulty in sufficiently removing the hetero-phase generated during the sintering from the viewpoint of an element diffusion speed. Further, the grain growth speed is also low, possibly failing to obtain a sufficient crystal grain diameter and to expect the improvement in squareness ratio. In contrast to this, the quality improvement treatment performed at the temperature higher by 10° C. or more than the holding temperature in the solution heat treatment makes it possible to sufficiently remove the above-described hetero-phase and increase the crystal grains constituting the main phase.

The holding temperature in the quality improvement treatment is preferably, for example, not lower than 1130° C. nor higher than 1190° C. When the holding temperature is lower than 1130° C. and when it is higher than 1190° C., the squareness ratio may decrease. When the heat treatment time is less than 2 hours, diffusion is insufficient, the hetero-phase is not sufficiently removed, and the effect of improving the squareness ratio is small. When the heat treatment time is more than 12 hours, the R element such as Sm evaporates, possibly failing to obtain good magnetic property. The heat treatment time in the quality improvement treatment is more preferably not less than 4 hours nor more than 10 hours, and furthermore preferably not less than 6 hours nor more than 8 hours. The quality improvement treatment is preferably performed in a vacuum or an inert atmosphere such as argon gas in order to prevent oxidation.

In this event, setting the pressure in the chamber in the quality improvement treatment to a positive pressure enhances the effect of suppressing generation of the hetero-phase. This can also suppress excessive evaporation of the R element, and therefor suppress the decrease of the coercive force.

In the solution heat treatment, a heat treatment is performed by holding the sintered body at a temperature of not lower than 1090° C. but lower than 1170° C. for not less than 3 hours nor more than 28 hours. When the holding temperature in the solution heat treatment is lower than 1090° C. and when it is 1170° C. or higher, the proportion of the $TbCu_7$ crystal phase existing in the specimen after the solution heat treatment is small, possibly deteriorating the magnetic property. The holding temperature is preferably not lower than 1100° C. nor higher than 1165° C. When the holding time in the solution heat treatment is less than 3 hours, the constituent phase is likely to become non-uniform, the coercive force is likely to decrease, the crystal grain diameter of the metallic structure is likely to decrease, the grain boundary phase ratio is likely to increase, thereby making the magnetization likely to deteriorate. When the holding temperature in the solution heat treatment is more than 28 hours, the magnetic property may deteriorate due to evaporation of the R element in the sintered body or the like. The holding time is preferably not less than 4 hours nor more than 24 hours, and more preferably not less than 10 hours nor more than 18 hours. The solution heat treatment performed in a vacuum or in an inert atmosphere such as argon gas can suppress oxidation of the powder.

Furthermore, after holding the isothermal temperature, the rapid cooling is performed. For example, the rapid cooling performed at a cooling rate of 170° C./min or more down to room temperature can stabilize the $TbCu_7$ crystal phase, easily expressing the coercive force. When the cooling rate is less than 170° C./min, the $Ce_2Ni_7$ crystal phase (2-7 crystal phase) is likely to be generated during the cooling. The presence of the 2-7 crystal phase possibly deteriorates the magnetization and also possibly decreases the coercive force. This is because Cu is often concentrated in the 2-7 crystal phase, which lowers the concentration of Cu in the main phase and less causes the phase separation by the aging treatment. Especially, in the composition containing the Fe concentration of 28 atomic percent or more, the cooling rate tends to be important.

The cooling when the solution heat treatment is performed after the quality improvement treatment is preferably slower than the rapid cooling after the solution heat treatment, namely, the cooling is preferably slow cooling. For example, the slow cooling is performed, after the quality improvement treatment, at a cooling rate of 15° C./min or less, preferably at a cooling rate of 10° C./min or less, and more preferably at a cooling rate of 5° C./min or less. By performing the slow cooling, the variations in the metallic structure can be reduced to further improve the squareness ratio.

Next, the aging treatment is applied to the sintered body after the rapid cooling. The aging treatment is a treatment to control the metallic structure to enhance the coercive force of the magnet, and aims to phase-separate the metallic structure of the magnet into a plurality of phases.

In the aging treatment, the sintered body is heated up to a temperature of not lower than 760° C. nor higher than 850° C., and then held at the reached temperature for not less than 20 hours nor more than 60 hours (first holding). Subsequently, the sintered body is subjected to the slow cooling at a cooling rate of not less than 0.2° C./min nor more than 2.0° C./min down to a temperature of not lower than 350° C. nor higher than 650° C., and then held at the reached temperature for not less than 0.5 hours nor more than 8 hours (second holding) for heat treatment. Then, the sintered body is cooled down to room temperature. Thus, the magnet of the sintered body can be obtained.

When the holding temperature is higher than 850° C. in the first holding, the cell phase becomes coarse, and the squareness ratio is likely to decrease. When the holding temperature is lower than 760° C., the cell structure is not sufficiently obtained, thereby making it difficult to express the coercive force. The holding temperature in the first holding is, for example, more preferably not lower than 780° C. nor higher than 840° C. When the holding time is less than 20 hours in the first holding, the cell structure becomes insufficient, thereby making it difficult to express the coercive force. When the holding time is longer than 60 hours, the cell wall phase becomes excessively thick, possibly deteriorating the squareness ratio. The holding time in the first holding is more preferably, for example, not less than 25 hours nor more than 40 hours.

When the cooling rate during the slow cooling is less than 0.2° C./min, the cell wall phase tends becomes excessively thick and the magnetization is likely to decrease. When the cooling rate is more than 2.0° C./min, a sufficient difference is not obtained in the Cu concentration between the cell phase and the cell wall phase, and the coercive force is likely to decrease. The cooling rate during the slow cooling is, for example, not less than 0.4° C./min nor more than 1.5° C./min, and more preferably not less than 0.5° C./min nor more than 1.3° C./min. When the slow cooling is performed down to lower than 350° C., the above-described low temperature hetero-phase is likely to be generated. If the slow cooling is performed down to a temperature higher than 650° C., the Cu concentration in the Cu rich phase does not sufficiently increase, possibly failing to obtain a sufficient coercive force. When the holding time in the second holding is more than 8 hours, the low temperature hetero-phase is generated, possibly failing to obtain a sufficient magnetic property.

In the aging treatment, the sintered body may be held at a predetermined temperature for a fixed time during the slow cooling, and may be subjected to further slow cooling. The above-described aging treatment may be regarded as the main aging treatment, and a preliminary aging treatment may be performed, prior to the main aging treatment, by holding the sintered body at a temperature lower than the holding temperature in the first holding and for a time shorter than the holding time in the first holding. Holding during the slow cooling and the preliminary aging treatment can further increase the squareness ratio.

In this embodiment, the quality improvement treatment is performed in addition to the sintering and the solution heat treatment. In the quality improvement treatment, a heat treatment is performed in a particular temperature range, which is lower than the holding temperature in the sintering and higher than the holding temperature in the solution heat treatment. This can sufficiently remove the hetero-phase, and thereby can control the form of the hetero-phase and the size of the crystal grains to control the size and the orientation of the crystal grains constituting the main phase. This brings about a state in which the cell structure is easily formed also around the grain boundary phase in the metallic structure, thus making it possible to obtain a good squareness ratio and a good coercive force even in, for example, the permanent magnet containing 28 atomic percent or more of Fe.

The quality improvement treatment may be performed after the sintering and before the aging treatment. For example, the solution heat treatment may be divided into a first solution heat treatment and a second solution heat treatment (also referred to as a re-solution heat treatment). The quality improvement treatment may be performed after the first solution heat treatment, and the second solution heat treatment may be performed after the quality improvement treatment. Alternatively, the quality improvement treatment may be performed a plurality of times during the solution heat treatment.

Second Embodiment

The permanent magnet of the first embodiment is usable in various motors and generators. The permanent magnet of the first embodiment is also usable as a stationary magnet and a variable magnet of a variable magnetic flux motor and a variable magnetic flux generator. The permanent magnet of the first embodiment is used to configure the various motors and generators. In applying the permanent magnet of the first embodiment to the variable magnetic flux motor, the techniques disclosed in Japanese Laid-open Patent Publication No. 2008-29148 and Japanese Laid-open Patent Publication No. 2008-43172 are applicable to the configuration of the variable magnetic flux motor and a drive system.

Figure 2:
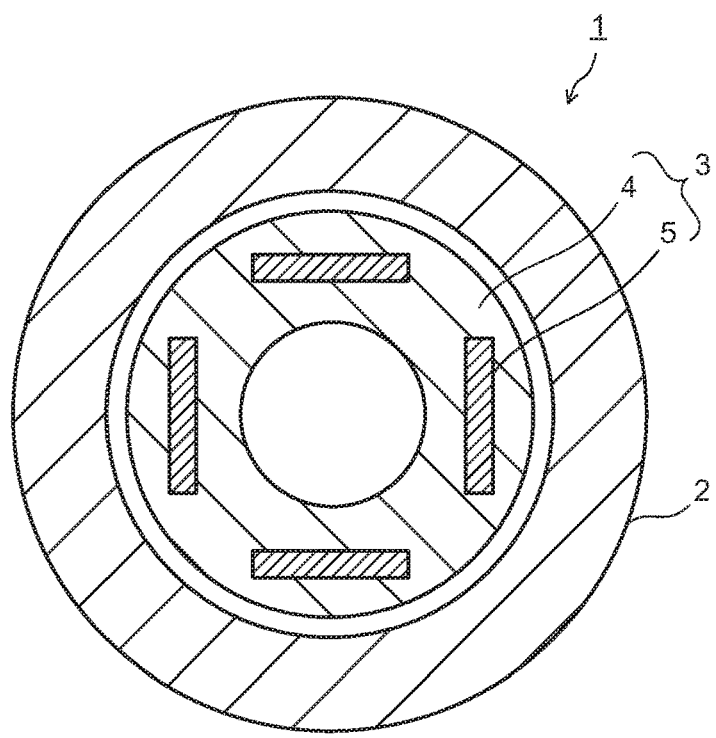
FIG. 2 is a view illustrating a permanent magnet motor.

Next, the motor and the generator including the above permanent magnet will be described referring to the drawings. FIG. 2 is a view illustrating a permanent magnet motor in this embodiment. A permanent magnet motor 1 illustrated in FIG. 2 includes a rotor 3 arranged in a stator 2. In an iron core 4 of the rotor 3, permanent magnets 5 are arranged which are the permanent magnets of the first embodiment. The use of the permanent magnets of the first embodiment can achieve high efficiency, downsizing, and low-cost of the permanent magnet motor 1, based on properties of the permanent magnets and the like.

Figure 3:
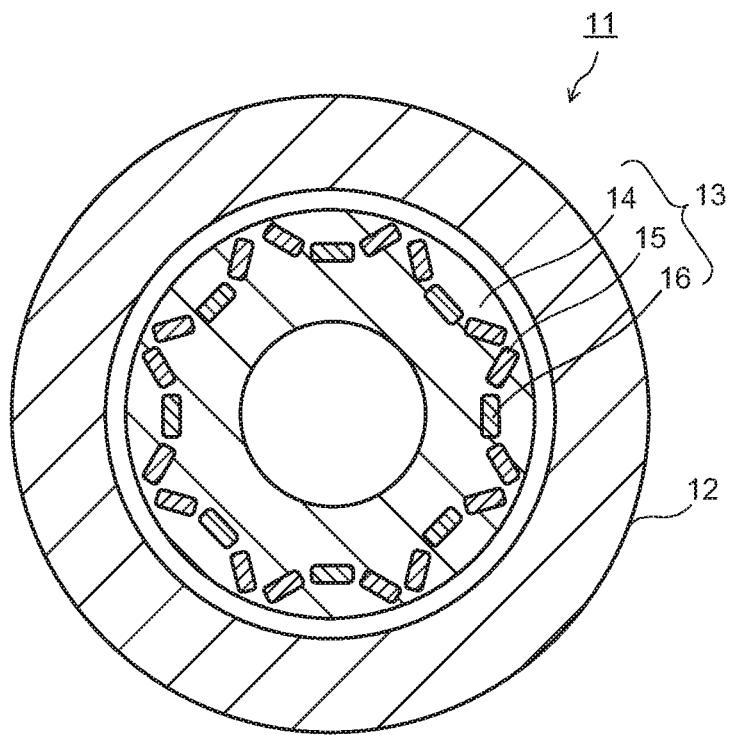
FIG. 3 is a view illustrating a variable magnetic flux motor.

FIG. 3 is a view illustrating a variable magnetic flux motor according to this embodiment. A variable magnetic flux motor 11 illustrated in FIG. 3 includes a rotor 13 arranged in a stator 12. In an iron core 14 of the rotor 13, the permanent magnets of the first embodiment are arranged as stationary magnets 15 and variable magnets 16. A magnetic flux density (flux quantum) of the variable magnet 16 can be variable. Since a magnetization direction of the variable magnet 16 is perpendicular to a Q-axis direction, the variable magnet 16 is not affected by a Q-axis current but can be magnetized by a D-axis current. The rotor 13 includes a magnetization coil (not illustrated). An electric current flowing from a magnetization circuit to this magnetization coil causes its magnetic field to directly act on the variable magnet 16.

According to the permanent magnet of the first embodiment, the stationary magnet 15 can obtain a suitable coercive force. In the case of applying the permanent magnet of the first embodiment to the variable magnet 16, it is only necessary to control the coercive force, for example, within a range of not less than 100 kA/m nor more than 500 kA/m by changing the above-described various conditions (the aging treatment condition and the like) of the manufacturing method. The variable magnetic flux motor 11 illustrated in FIG. 3 can employ the permanent magnet of the first embodiment for both the stationary magnet 15 and the variable magnet 16, and the permanent magnet of the first embodiment may be used for any one of the magnets. The variable magnetic flux motor 11 can output large torque with a small apparatus size, and is therefore suitable as a motor of a hybrid vehicle, an electric vehicle, or the like required to have a high-output and compact motor.

Figure 4:
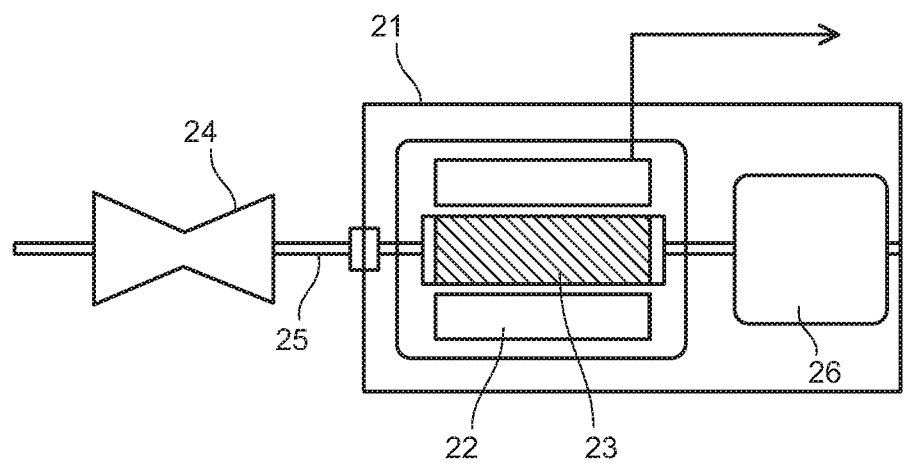
FIG. 4 is a view illustrating a generator.

FIG. 4 illustrates a generator according to this embodiment. A generator 21 illustrated in FIG. 4 includes a stator 22 using the above-described permanent magnet. A rotor 23 disposed inside the stator 22 is coupled, via a shaft 25, to a turbine 24 disposed at one end of the generator 21. The turbine 24 is rotated by, for example, fluid supplied from the outside. Instead of the turbine 24 rotated by the fluid, the shaft 25 can be rotated by transfer of dynamic rotation such as regenerated energy of a vehicle or the like. The stator 22 and the rotor 23 can employ various publicly-known configurations.

The shaft 25 is in contact with a commutator (not illustrated) disposed on the opposite side to the turbine 24 with respect to the rotor 23, so that an electromotive force generated by the rotation of the rotor 23 is boosted to a system voltage and is transmitted as an output from the generator 21 via an isolated-phase bus and a main transformer (not illustrated). The generator 21 may be any of an ordinary generator and a variable magnetic flux generator. The rotor 23 generates a charge by static electricity from the turbine 2 and an axial current accompanying power generation. Therefore, the electric generator 21 includes a brush 26 for discharging the charges of the rotor 23.

As described above, the application of the permanent magnet to the generator brings about the effects such as high efficiency, downsizing, and low cost.

While certain embodiments of the present invention have been described, these embodiments have been presented by way of example only, and are not intended to limit the scope of the invention. Indeed, the novel embodiments described herein may be embodied in a variety of other forms. Various omissions, substitutions, changes and modifications may be made to the embodiments described herein without departing from the spirit and scope of the present invention. The appended claims and their equivalents are intended to cover such embodiments and modifications as would fall within the scope and spirit of the invention.

EXAMPLES

In examples, specific examples of the permanent magnet will be described. In the examples, the permanent magnet containing Zr as the M element will be described.

Example 1, Example 2

Raw materials used for the permanent magnet were weighed at a prescribed ratio and mixed together, and then melted by arc in an Ar gas atmosphere to prepare an alloy ingot. The alloy ingot was held at 1190° C. for 2 hours for heat treatment. Then, the alloy ingot was subjected to coarse pulverization and pulverization by a jet mill to prepare an alloy powder as a raw material powder of a magnet. The obtained alloy powder was press-formed in a magnetic field to fabricate a compression molded body.

Subsequently, the compression molded body of the alloy powder was put in a sintering furnace chamber, the inside of the chamber was brought into a vacuum state, and then the compression molded body was heated up to 1180° C. and held at the reached temperature for 10 minutes. Then, an Ar gas was introduced into the chamber, the compression molded body was heated up to 1190° C. in the Ar gas atmosphere and held at the reached temperature for 1.5 hours with the pressure set to 35 kPa as listed in Table 2 as the first sintering. Thereafter, the compression molded body was held at the above-described temperature for 6 hours with the pressure changed to 130 kPa as the second sintering, and thereby was sintered. Then, the quality improvement treatment was carried out by holding the sintered body at 1185° C. for 3 hours. Then, the sintered body was slowly cooled at a cooling rate of 6.0° C./min down to 1180° C., and held at the reached temperature for 10 hours for the solution heat treatment. The sintered body was then cooled to room temperature. The cooling rate after the solution heat treatment was set to 170° C./min.

Then, the sintered body after the solution heat treatment was heated up to 760° C. and held at the reached temperature for 1 hour, and then slowly cooled at a cooling rate of 1.5° C./min down to 350° C. Then, the sintered body was heated up to 835° C. and held at the reached temperature for 30 hours as the aging treatment. Thereafter, the sintered body was slowly cooled at a cooling rate of 0.8° C./min down to 400° C., and held at the reached temperature for 1 hour. Thereafter, the sintered body was cooled down to room temperature in the furnace, resulting in a magnet.

Further, composition analysis of the magnet was carried out by an inductively coupled plasma (ICP) method. The composition analysis by the ICP method was carried out in the following procedure. First, a specimen taken from the prescribed measurement location was pulverized in a mortar, and a certain amount of the pulverized specimen was measured by weight and put in a quartz beaker. Further, mixed acid (acid including nitric acid and hydrochloric acid) was put in the beaker. The beaker was heated to approximately 140° C. on a hot plate to completely melt the specimen in the beaker. The specimen was cooled as it was and moved to a PFA-made measuring flask to determine a volume of the specimen, which was used as a specimen solution.

Further, the ICP emission spectrochemical analysis device was used to determine the quantities of components contained in the specimen solution by a calibration curve method. The ICP emission spectrochemical analysis device was SPS4000, manufactured by SII NanoTechnology Inc. The composition of the obtained magnet is as listed in Table 1. The average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The measurement results are listed in Table 3. The measuring device used for examples and comparative examples was HD2300, manufactured by Hitachi High-Technologies Corporation.

Example 3, Example 4, Example 5

Raw materials were weighed at a prescribed ratio and mixed together, and then melted by a high frequency wave in an Ar gas atmosphere to prepare an alloy ingot. The alloy ingot was subjected to coarse pulverization and then to a heat treatment at 1160° C. for 24 hours, and rapidly cooled down to room temperature. The alloy ingot was further subjected to coarse pulverization and pulverization by a jet mill to prepare an alloy powder as a raw material powder of a magnet. The alloy powder was further press-formed in a magnetic field to fabricate a compression molded body.

Subsequently, the compression molded body of the alloy powder was put in a chamber of a sintering furnace, the inside of the chamber was brought into a vacuum state, and then the compression molded body was heated up to 1170° C. and held at the reached temperature for 60 minutes. Then, an Ar gas was introduced into the chamber. The temperature in the chamber in the Ar gas atmosphere was elevated up to 1195° C., and the compression molded body was held at the reached temperature for 2 hours with the pressure set to 80 kPa as the first sintering as listed in Table 2. Thereafter, the compression molded body was held at the reached temperature for 4 hours with the pressure set to 190 kPa as the second sintering, and thereby was sintered. Then, the quality improvement treatment was carried out by holding the sintered body at 1170° C. for 1 hour. Then, the sintered body was slowly cooled at a cooling rate of 4.0° C./min down to 1135° C., and held at the reached temperature for 15 hours for the solution heat treatment. The sintered body was then cooled down to room temperature. The cooling rate after the solution heat treatment was set to 160° C./min.

Then, the sintered body after the solution heat treatment was heated up to 700° C. and held at the reached temperature for 1.5 hours, and subsequently heated up to 840° C. and held at the reached temperature for 50 hours as the aging treatment. Thereafter, the sintered body was slowly cooled at a cooling rate of 0.55° C./min down to 450° C., and held at the reached temperature for 4 hours. Thereafter, the sintered body was slowly cooled at a cooling rate of 0.5° C./min down to 360° C., and held at the reached temperature for 1 hour. Thereafter, the sintered body was cooled down to room temperature in the furnace, resulting in a magnet.

Further, the ICP emission spectrochemical analysis device was used to determine the quantities of components contained in the specimen solution by a calibration curve method. The composition of the obtained magnet is as listed in Table 1. As in other examples, the average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The results are listed in Table 3.

Example 6, Example 7

Raw materials were weighed at a prescribed ratio and mixed together, and then melted by a high frequency wave in an Ar gas atmosphere to prepare an alloy ingot. The alloy ingot was subjected to coarse pulverization and then to a heat treatment at 1150° C. for 24 hours, and rapidly cooled down to room temperature. The alloy ingot was further subjected to coarse pulverization and pulverization by a jet mill to prepare an alloy powder as a raw material powder of a magnet. The alloy powder was further press-formed in a magnetic field to fabricate a compression molded body.

Subsequently, the compression molded body of the alloy powder was put in a chamber of a sintering furnace, the inside of the chamber was brought into a vacuum state, and then the compression molded body was heated up to 1160° C. and held at the reached temperature for 50 minutes. Then, an Ar gas was introduced into the chamber. The temperature in the chamber in the Ar gas atmosphere was elevated up to 1195° C., and the compression molded body was held at the reached temperature for 3 hours with the pressure set to 65 kPa as the first sintering as listed in Table 2. Thereafter, the compression molded body was held at the reached temperature for 10 hours with the pressure set to 150 kPa as the second sintering, and thereby was sintered. Then, the quality improvement treatment was carried out by holding the sintered body at 1160° C. for 10 hours. Then, the sintered body was slowly cooled at a cooling rate of 5.0° C./min down to 1120° C., and held at the reached temperature for 14 hours for the solution heat treatment. The sintered body was then cooled down to room temperature. The cooling rate after the solution heat treatment was set to 200° C./min.

Then, the sintered body after the solution heat treatment was then heated up to 660° C. and held at the reached temperature for 1 hour, and subsequently heated up to 840° C. and held at the reached temperature for 40 hours as the aging treatment. Thereafter, the sintered body was slowly cooled at a cooling rate of 0.6° C./min down to 500° C., and held at the reached temperature for 1 hour. Thereafter, the sintered body was slowly cooled at a cooling rate of 0.5° C./min down to 400° C., and held at the reached temperature for 1 hour. Thereafter, the sintered body was cooled down to room temperature in the furnace, resulting in a magnet.

As in other examples, the ICP method was used to confirm the composition of each magnet. The composition of the obtained magnet is as listed in Table 1. As in other examples, the average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The results are listed in Table 3.

Example 8

Raw materials were weighed at a prescribed ratio and mixed together, and then melted by a high frequency wave in an Ar gas atmosphere to prepare an alloy ingot. The alloy ingot was subjected to coarse pulverization and then to a heat treatment at 1170° C. for 16 hours, and rapidly cooled down to room temperature. The alloy ingot was further subjected to coarse pulverization and pulverization by a jet mill to prepare an alloy powder as a raw material powder of a magnet. The alloy powder was further press-formed in a magnetic field to fabricate a compression molded body.

Subsequently, the compression molded body of the alloy powder was put in a chamber of a sintering furnace, the inside of the chamber was brought into a vacuum state, and then the compression molded body was heated up to 1165° C. and held at the reached temperature for 60 minutes. Then, an Ar gas was introduced into the chamber. The temperature in the chamber in the Ar gas atmosphere was elevated up to 1195° C., and the compression molded body was held at the reached temperature for 1 hour with the pressure set to 20 kPa as the first sintering as listed in Table 2. Thereafter, the compression molded body was held at the reached temperature for 6 hours with the pressure set to 110 kPa as the second sintering, and thereby was sintered. Then, the quality improvement treatment was carried out by holding the sintered body at 1170° C. for 6 hours. Then, the sintered body was slowly cooled at a cooling rate of 5.0° C./min down to 1150° C., and held at the reached temperature for 12 hours for the solution heat treatment. The sintered body was then cooled down to room temperature. The cooling rate after the solution heat treatment was set to 200° C./min.

Then, the sintered body after the solution heat treatment was heated up to 780° C. and held at the reached temperature for 2 hours, and subsequently heated up to 835° C. and held at the reached temperature for 45 hours as the aging treatment. Thereafter, the sintered body was slowly cooled at a cooling rate of 0.7° C./min down to 600° C., and held at the reached temperature for 3.5 hours. Thereafter, the sintered body was slowly cooled at a cooling rate of 0.5° C./min down to 400° C., and held at the reached temperature for 1 hour. Thereafter, the sintered body was cooled down to room temperature in the furnace, resulting in a magnet.

As in other examples, the ICP method was used to confirm the composition of each magnet. The composition of the obtained magnet is as listed in Table 1. As in other examples, the average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The results are listed in Table 3.

Example 9 to Example 14

The alloy powder having the same composition as that in Example 8 was used as the raw material and press-formed in a magnetic field to fabricate a compression molded body. Subsequently, the compression molded body of the alloy powder was put in a chamber of a sintering furnace, the inside of the chamber was brought into a vacuum state, and then the compression molded body was heated up to 1180° C. and held at the reached temperature for 50 minutes. Then, an Ar gas was introduced into the chamber. Then, the temperature in the chamber in the Ar gas atmosphere was elevated up to 1195° C. to perform sintering.

In Example 9, as listed in Table 2, the compression molded body was held at the reached temperature for 1 hour with the pressure set to 50 kPa as the first sintering. Thereafter, the compression molded body was held at the reached temperature for 6 hours with the pressure set to 110 kPa as the second sintering, and thereby was sintered.

In Example 10, as listed in Table 2, the compression molded body was held at the reached temperature for 1 hour with the pressure set to 80 kPa as the first sintering. Thereafter, the compression molded body was held at the reached temperature for 6 hours with the pressure set to 110 kPa as the second sintering, and thereby was sintered.

In Example 11, as listed in Table 2, the compression molded body was held at the reached temperature for 3 hours with the pressure set to 20 kPa as the first sintering. Thereafter, the compression molded body was held at the reached temperature for 6 hours with the pressure set to 110 kPa as the second sintering, and thereby was sintered.

In Example 12, as listed in Table 2, the compression molded body was held at the reached temperature for 1 hour with the pressure set to 20 kPa as the first sintering. Thereafter, the compression molded body was held at the reached temperature for 6 hours with the pressure set to 150 kPa as the second sintering, and thereby was sintered.

In Example 13, as listed in Table 2, the compression molded body was held at the reached temperature for 1 hour with the pressure set to 20 kPa as the first sintering. Thereafter, the compression molded body was held at the reached temperature for 6 hours with the pressure set to 220 kPa as the second sintering, and thereby was sintered.

In Example 14, as listed in Table 2, the compression molded body was held at the reached temperature for 1 hour with the pressure set to 50 kPa as the first sintering. Thereafter, the compression molded body was held at the reached temperature for 6 hours with the pressure set to 150 kPa as the second sintering, and thereby was sintered.

Subsequently, the sintered body was held at 1160° C. for 10 hours for the solution heat treatment. Then, the sintered body was slowly cooled at a cooling rate of 5.0° C./min down to 1120° C., and held at the reached temperature for 14 hours for the solution heat treatment. Thereafter, the sintered body was cooled down to room temperature. The cooling rate after the solution heat treatment was set to 200° C./min.

Subsequently, the sintered body after the solution heat treatment in each example was subjected to the aging treatment and so on by the same method as that in Example 8, resulting in a magnet.

As in other examples, the ICP method was used to confirm the composition of each of the magnets. The composition of the obtained magnet is as listed in Table 1. As in other examples, the average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The results are listed in Table 3.

Comparative Example 1, Comparative Example 2

The magnets having the compositions as listed in Table 1 were fabricated by the same methods as that Example 1 and Example 2, respectively. As in examples, the average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The measurement results are listed in Table 3.

Comparative Example 3 to Comparative Example 7

The alloy powder having the same composition as that in Example 8 was used as the raw material and press-formed in a magnetic field to fabricate a compression molded body. Subsequently, the compression molded body of the alloy powder was put in a chamber of a sintering furnace, and the inside of the chamber was brought into a vacuum state, and then the compression molded body was heated up to 1180° C. and held at the reached temperature for 50 minutes. Then, an Ar gas was introduced into the chamber. Then, the temperature in the chamber in the Ar gas atmosphere was elevated up to 1195° C. to perform sintering.

In Comparative Example 3, as listed in Table 2, the compression molded body was held at the reached temperature for 1 hour with the pressure set to 7 kPa as the first sintering. Thereafter, the compression molded body was held at the reached temperature for 6 hours with the pressure set to 110 kPa as the second sintering, and thereby was sintered.

In Comparative Example 4, as listed in Table 2, the compression molded body was held at the reached temperature for 1 hour with the pressure set to 120 kPa as the first sintering. Thereafter, the compression molded body was held at the reached temperature for 6 hours with the pressure set to 130 kPa as the second sintering, and thereby was sintered.

In Comparative Example 5, as listed in Table 2, the compression molded body was held at the reached temperature for 0.25 hours with the pressure set to 20 kPa as the first sintering. Thereafter, the compression molded body was held at the reached temperature for 6 hours with the pressure set to 110 kPa as the second sintering, and thereby was sintered.

In Comparative Example 6, as listed in Table 2, the compression molded body was held at the reached temperature for 1 hour with the pressure set to 20 kPa as the first sintering. Thereafter, the compression molded body was held at the reached temperature for 6 hours with the pressure set to 270 kPa as the second sintering, and thereby was sintered.

In Comparative Example 7, as listed in Table 2, the compression molded body was held at the reached temperature for 1 hour with the pressure was set to 20 kPa as the first sintering. Thereafter, the compression molded body was held at the reached temperature for 6 hours with the pressure set to 80 kPa as the second sintering, and thereby was sintered.

Subsequently, the sintered body was held at 1160° C. for 10 hours for the solution heat treatment. Then, the sintered body was slowly cooled at a cooling rate of 5.0° C./min down to 1120° C., and held at the reached temperature for 14 hours for the solution heat treatment. Thereafter, the sintered body was cooled down to room temperature. The cooling rate after the solution heat treatment was set to 200° C./min.

Subsequently, the sintered body after the solution heat treatment in each example was subjected to the aging treatment and so on by the same method as that in Example 8, resulting in a magnet.

As in other examples, the ICP method was used to confirm the composition of each of the magnets. The composition of the obtained magnet is as listed in Table 1. As in other examples, the average values of the Fe concentration and the R element concentration of a plurality of crystal grains constituting the main phase, the ratio of magnetization M1 when the magnetic field is −200 kA/m to the residual magnetization M (M1/M), and the squareness ratio, the coercive force, and the residual magnetization were also measured. The results are listed in Table 3.

As described above, in the permanent magnet in each example, the average values of the high Fe concentration and the R element concentration are controlled in 20 or more crystal grains constituting the main phase, thereby suppressing the deterioration of magnetization. Even in the case where the Fe concentration is 28 atomic percent or more, each permanent magnet expresses good squareness ratio, high coercive force, and high magnetization. In contrast to this, it is found that Comparative Examples 1, 2 are greatly different in composition, and sufficient magnetic property cannot be obtained because of generation of a hetero-phase or the like. It is also found that in Comparative Example 3 to Comparative Example 7, sufficient magnetic property cannot be obtained because of a large variation of the R element and a low average value of the R element concentration.

TABLE 1

Magnet Composition (Atomic Ratio)
((Other) Example 1: Nd, Example 2: Ti, Example 3: Mn, Example 4: Cr, Example 5: Al_0.0115 + Cr_0.015, Comparative Example 1: Cr, Comparative Example 2: Ti)

|  | Sm | Co | Fe | Cu | Zr | Others |
|---|---|---|---|---|---|---|
| Exam. 1 | 10.62 | 52.33 | 28.38 | 5.32 | 2.66 | 0.68 |
| Exam. 2 | 12.20 | 51.37 | 28.98 | 5.44 | 1.58 | 0.44 |
| Exam. 3 | 10.81 | 52.76 | 29.88 | 4.95 | 1.43 | 0.18 |
| Exam. 4 | 11.83 | 51.74 | 29.80 | 4.85 | 1.61 | 0.16 |
| Exam. 5 | 11.63 | 47.19 | 29.43 | 10.16 | 1.50 | 0.09 |
| Exam. 6 | 11.70 | 49.45 | 32.23 | 5.03 | 1.59 | 0.00 |
| Exam. 7 | 11.76 | 47.43 | 33.97 | 5.29 | 1.54 | 0.00 |
| Exam. 8 | 11.76 | 51.41 | 30.00 | 5.21 | 1.61 | 0.00 |
| Exam. 9 | 11.76 | 51.41 | 30.00 | 5.21 | 1.61 | 0.00 |
| Exam. 10 | 11.76 | 51.41 | 30.00 | 5.21 | 1.61 | 0.00 |
| Exam. 11 | 11.76 | 51.41 | 30.00 | 5.21 | 1.61 | 0.00 |
| Exam. 12 | 11.76 | 51.41 | 30.00 | 5.21 | 1.61 | 0.00 |
| Exam. 13 | 11.76 | 51.41 | 30.00 | 5.21 | 1.61 | 0.00 |
| Exam. 14 | 11.76 | 51.41 | 30.00 | 5.21 | 1.61 | 0.00 |
| Comp. Exam. 1 | 10.11 | 52.66 | 28.56 | 5.35 | 2.68 | 0.65 |
| Comp. Exam. 2 | 11.26 | 49.27 | 29.99 | 4.88 | 4.44 | 0.16 |
| Comp. Exam. 3 | 11.76 | 51.41 | 30.00 | 5.21 | 1.61 | 0.00 |
| Comp. Exam. 4 | 11.76 | 51.41 | 30.00 | 5.21 | 1.61 | 0.00 |
| Comp. Exam. 5 | 11.76 | 51.41 | 30.00 | 5.21 | 1.61 | 0.00 |
| Comp. Exam. 6 | 11.76 | 51.41 | 30.00 | 5.21 | 1.61 | 0.00 |
| Comp. Exam. 7 | 11.76 | 51.41 | 30.00 | 5.21 | 1.61 | 0.00 |

TABLE 2

|  | First Sintering | | Second Sintering | |
|---|---|---|---|---|
|  | Pressure (kPa) | Time (hr) | Pressure (kPa) | Time (hr) |
| Exam. 1 | 35 | 1.5 | 130 | 6 |
| Exam. 2 | 35 | 1.5 | 130 | 6 |
| Exam. 3 | 80 | 2 | 190 | 4 |
| Exam. 4 | 80 | 2 | 190 | 4 |
| Exam. 5 | 65 | 3 | 150 | 10 |
| Exam. 6 | 65 | 3 | 150 | 10 |
| Exam. 7 | 65 | 3 | 150 | 10 |
| Exam. 8 | 20 | 1 | 110 | 6 |
| Exam. 9 | 50 | 1 | 110 | 6 |
| Exam. 10 | 80 | 1 | 110 | 6 |
| Exam. 11 | 20 | 3 | 110 | 6 |
| Exam. 12 | 20 | 1 | 150 | 6 |
| Exam. 13 | 20 | 1 | 220 | 6 |
| Exam. 14 | 50 | 1 | 150 | 6 |
| Comp. Exam. 1 | 35 | 1.5 | 130 | 6 |
| Comp. Exam. 2 | 80 | 2 | 190 | 4 |
| Comp. Exam. 3 | 7 | 1 | 110 | 6 |
| Comp. Exam. 4 | 120 | 1 | 130 | 6 |
| Comp. Exam. 5 | 20 | 0.25 | 110 | 6 |
| Comp. Exam. 6 | 20 | 1 | 270 | 6 |
| Comp. Exam. 7 | 20 | 1 | 80 | 6 |

TABLE 3

|  | Average Value of Fe Concentration [at. %] | Average Value of R Element Concentration [at. %] | Coercive Force iHc (kA/m) | Residual Magnetization (T) | Squareness Ratio (%) | M1/M (%) |
|---|---|---|---|---|---|---|
| Exam. 1 | 28.5 | 10.6 | 1690 | 1.17 | 95.9 | 96.4 |
| Exam. 2 | 29.8 | 11.6 | 1650 | 1.18 | 95.4 | 97.5 |
| Exam. 3 | 30.6 | 11.4 | 1510 | 1.21 | 92.5 | 94.7 |
| Exam. 4 | 30.7 | 11.7 | 1430 | 1.20 | 92.1 | 95.0 |
| Exam. 5 | 30.2 | 11.1 | 1410 | 1.23 | 93.4 | 96.9 |
| Exam. 6 | 33.2 | 11.4 | 1350 | 1.24 | 94.2 | 93.2 |
| Exam. 7 | 35.1 | 11.6 | 1220 | 1.25 | 93.7 | 92.8 |
| Exam. 8 | 30.6 | 10.6 | 1550 | 1.23 | 94.2 | 95.4 |
| Exam. 9 | 30.9 | 10.9 | 1660 | 1.24 | 94.4 | 96.3 |
| Exam. 10 | 31.0 | 11.0 | 1610 | 1.23 | 94.3 | 96.0 |
| Exam. 11 | 31.0 | 11.1 | 1600 | 1.23 | 94.3 | 96.1 |
| Exam. 12 | 31.1 | 11.3 | 1620 | 1.23 | 94.5 | 97.4 |
| Exam. 13 | 31.9 | 11.4 | 1570 | 1.23 | 94.4 | 97.2 |
| Exam. 14 | 31.8 | 11.5 | 1690 | 1.24 | 94.6 | 95.5 |
| Comp. Exam. 1 | 25.5 | 9.3 | 190 | 1.06 | 60.4 | 25.5 |
| Comp. Exam. 2 | 28.0 | 9.0 | 300 | 1.03 | 59.2 | 67.4 |
| Comp. Exam. 3 | 30.3 | 9.6 | 1500 | 1.15 | 88.8 | 85.0 |
| Comp. Exam. 4 | 30.6 | 9.2 | 1470 | 1.10 | 85.3 | 83.4 |
| Comp. Exam. 5 | 29.5 | 9.5 | 1520 | 1.20 | 90.5 | 85.2 |
| Comp. Exam. 6 | 30.5 | 9.2 | 1300 | 1.18 | 91.0 | 86.1 |
| Comp. Exam. 7 | 30.6 | 8.9 | 1220 | 1.16 | 79.7 | 79.4 |

What is claimed is:

1. A permanent magnet expressed by a composition formula:

$$R_p Fe_q M_r Cu_t Co_{100-p-q-r-t}$$

where R represents at least one element selected from the group consisting of rare earth elements, M represents at least one element selected from the group consisting of Zr, Ti, and Hf, p is a number satisfying $10.5 \leq p \leq 12.4$ atomic percent, q is a number satisfying $28 \leq q \leq 40$ atomic percent, r is a number satisfying $0.88 \leq r \leq 4.3$ atomic percent, and t is a number satisfying $3.5 \leq t \leq 13.5$ atomic percent, the magnet comprising:

a metallic structure including crystal grains which constitutes a main phase having a $Th_2Zn_{17}$ crystal phase, wherein an average value of Fe concentrations in the crystal grains of 20 or more is 28 atomic percent or more and an average value of R element concentrations in the crystal grains of 20 or more is 10 atomic percent or more, a squareness ratio of the magnet is 92.1% or more and 95.9% or less, and a magnetization when a magnetic field is −200 kA/m is 95.5% or more and 98.9% or less of a residual magnetization in an M-H curve of the magnet.

2. The magnet according to claim 1,
wherein the main phase has a composition expressed by a composition formula:

$$R_{p1} Fe_{q1} M_{r1} Cu_{t1} Co_{100-p1-q1-r1-t1}$$

where p1 is a number satisfying $11.1 \leq p1 \leq 20$ atomic percent, q1 is a number satisfying $28 \leq q1 \leq 40$ atomic percent, r1 is a number satisfying $1 < r1 \leq 15$ atomic percent, and t1 is a number satisfying $4 \leq t1 \leq 13.5$ atomic percent.

3. The magnet according to claim 1,
wherein the main phase has a cell phase having the $Th_2Zn_{17}$ crystal phase, and a Cu rich phase having a Cu concentration higher than that of the cell phase.

4. The magnet according to claim 1,
wherein 50 atomic percent or more of the R element in the composition formula is Sm, and
wherein 50 atomic percent or more of the M element in the composition formula is Zr.

5. A motor comprising the magnet according to claim 1.

6. A generator comprising the magnet according to claim 1.

7. A vehicle comprising the motor according to claim 5.

8. A vehicle comprising the generator according to claim 6.

9. The magnet according to claim 1,
wherein the residual magnetization of the magnet is 1.17 T or more and 1.25 T or less.

* * * * *